United States Patent
Zagaynov et al.

(10) Patent No.: US 12,387,370 B2
(45) Date of Patent: Aug. 12, 2025

(54) DETECTION AND IDENTIFICATION OF OBJECTS IN IMAGES

(71) Applicant: ABBYY Development Inc., Dover, DE (US)

(72) Inventors: Ivan Zagaynov, Moscow Region (RU); Andrew Zharkov, Moscow Region (RU)

(73) Assignee: ABBYY Development Inc., Dover, DE (US)

( * ) Notice: Subject to any disclaimer, the term of this patent is extended or adjusted under 35 U.S.C. 154(b) by 357 days.

(21) Appl. No.: 18/170,978

(22) Filed: Feb. 17, 2023

(65) Prior Publication Data

US 2023/0206487 A1    Jun. 29, 2023

Related U.S. Application Data

(62) Division of application No. 16/749,263, filed on Jan. 22, 2020, now Pat. No. 11,587,216.

(30) Foreign Application Priority Data

Jan. 21, 2020    (RU) .................................. 2020102275

(51) Int. Cl.
   *G06T 7/73*         (2017.01)
   *G06N 3/045*        (2023.01)
   (Continued)

(52) U.S. Cl.
   CPC ............... *G06T 7/73* (2017.01); *G06N 3/045* (2023.01); *G06N 3/084* (2013.01); *G06N 20/10* (2019.01);
   (Continued)

(58) Field of Classification Search
   CPC   G06T 7/73; G06T 7/0002; G06T 7/70; G06T 2207/10024; G06T 2207/20081;
   (Continued)

(56) References Cited

U.S. PATENT DOCUMENTS

| | | |
|---|---|---|
| 7,653,244 B2 | 1/2010 | Potts |
| 7,958,063 B2 | 6/2011 | Long |

(Continued)

FOREIGN PATENT DOCUMENTS

| | | |
|---|---|---|
| CN | 106780612 A | 5/2017 |
| CN | 108256549 A | 7/2018 |

(Continued)

OTHER PUBLICATIONS

A.B. Jung, "imgaug," https://github.com/aleju/imgaug, GitHub—aleju/imgaug: Image Augmentation for Machine Learning Experiments, accessed on Jan. 21, 2020, 25 pages.

(Continued)

*Primary Examiner* — Charlotte M Baker
(74) *Attorney, Agent, or Firm* — Lowenstein Sandler LLP

(57) ABSTRACT

Aspects of the disclosure provide for mechanisms for identification of objects in images using neural networks. A method of the disclosure includes: obtaining an image, representing each element of a plurality of elements of the image via an input vector of a plurality of input vectors, each input vector having one or more parameters pertaining to visual appearance of a respective element of the image, providing the plurality of input vectors to a first subnetwork of a neural network to obtain a plurality of output vectors, wherein each of the plurality of output vectors is associated with an element of the image, identifying, based on the plurality of output vectors, a sub-plurality of elements of the image as belonging to the image of the object, and determining, based on locations of the sub-plurality of elements, a location of an image of an object within the image.

20 Claims, 10 Drawing Sheets

(51) Int. Cl.
*G06N 3/084* (2023.01)
*G06N 20/10* (2019.01)
*G06N 20/20* (2019.01)
*G06T 7/00* (2017.01)
*G06T 7/70* (2017.01)
*G06V 10/764* (2022.01)
*G06V 10/82* (2022.01)
*G06V 20/00* (2022.01)

(52) U.S. Cl.
CPC ........... *G06N 20/20* (2019.01); *G06T 7/0002* (2013.01); *G06T 7/70* (2017.01); *G06V 10/764* (2022.01); *G06V 10/82* (2022.01); *G06V 20/00* (2022.01); *G06T 2207/10024* (2013.01); *G06T 2207/20081* (2013.01); *G06T 2207/20084* (2013.01)

(58) Field of Classification Search
CPC ........... G06T 2207/20084; G06T 2207/30176; G06N 3/045; G06N 3/084; G06N 20/10; G06N 20/20; G06N 3/044; G06N 3/02; G06V 10/764; G06V 10/82; G06V 20/00; G06V 10/40; G06F 18/00
USPC ........................................................ 382/181
See application file for complete search history.

(56) References Cited

U.S. PATENT DOCUMENTS

| | | | |
|---|---|---|---|
| 8,608,073 B2 | 12/2013 | Baqai | |
| 9,633,282 B2 | 4/2017 | Sharma | |
| 10,990,645 B1 * | 4/2021 | Shi | G06N 3/045 |
| 11,423,615 B1 | 8/2022 | Villalon | |
| 11,461,393 B1 * | 10/2022 | Jain | G06V 20/40 |
| 2005/0089216 A1 | 4/2005 | Schiller | |
| 2005/0147291 A1 | 7/2005 | Huang | |
| 2008/0082468 A1 | 4/2008 | Long | |
| 2016/0093050 A1 | 3/2016 | Kim | |
| 2016/0171707 A1 | 6/2016 | Schwartz | |
| 2018/0165546 A1 | 6/2018 | Skans | |
| 2018/0173971 A1 | 6/2018 | Jia | |
| 2019/0385054 A1 | 12/2019 | Zuev | |
| 2020/0250528 A1 | 8/2020 | van den Oord | |

FOREIGN PATENT DOCUMENTS

| | | |
|---|---|---|
| CN | 108256549 B | 3/2019 |
| CN | 109740585 A | 5/2019 |
| CN | 106780612 B | 9/2019 |
| CN | 110222752 A | 9/2019 |
| RU | 2656708 C1 | 6/2018 |
| RU | 2699687 C1 | 9/2019 |

OTHER PUBLICATIONS

A. Namane and M. Arezki, "Fast real time ld barcode detection from webcam images using the bars detection method," Proceedings to the World Congress on Engineering 2017 vol. I, WCE 2017, Jul. 5-7, 2017, London, U.K., 7 pages.

A. Zamberletti, I. Gallo, and S. Albertini, "Robust angle invariant 1d barcode detection," in 2013 2nd IAPR Asian Conference on Pattern Recognition, Nov. 2013, pp. 160-164.

C. Creusot and A. Munawar, "Low-computation egocentric barcode detector for the blind," in IEEE International Conference on Image Processing (ICIP), Sep. 2016, pp. 2856-2860.

C. Creusot and A. Munawar, "Real-time barcode detection in the wild," in 2015 IEEE Winter Conference on Applications of Computer Vision, Jan. 2015, pp. 239-245.

D. Deng, H. Liu, X. Li, and D. Cai, "Pixellink: Detecting scene text via instance segmentation," in The Thirty-Second MAI Conference on Artificial Intelligence (AAAi-18), 2018, pp. 6773-6780.

D. Kold Hansen, K. Nasrollahi, C. B. Rasmusen, and T. Moes-lund, "Real-time barcode detection and classification using deep learning," In Proceedings of the 9th International Joint Conference on Computational Intelligence (UCCI 2017)01 201, pp. 321-321.

E. Ohbuchi, H. Hanaizumi, and L.A. Hock, "Barcode readers using the camera device in mobile phones," in 2004 International Conference on Cyberworlds, IEEE Nov. 2004, pp. 260-265.

E. Tekin, D. Vasquez, and J_ M. Coughlan, "S-k smartphone barcode reader for the blind," J Technol Pers Disabil, vol. 28, pp. 230-239, 2013.

F. Yu and V. Koltun, "Multi-scale context aggregation by dilated convolutions," CoRR, vol. abs/1511.07122, 2015. 13 Pages.

G. So'ro's and C. Flo'rkemeier, "Blur-resistant joint 1d and 2d barcode localization for smartphones," in Proceedings of the 12th International Conference on Mobile and Ubiquitous Multimedia, ser. MUM '13. New York, NY, USA: ACM, 2013, pp. 11:1-11:8.

M. Katona and L. G. Nyu-1, "Efficient 1d and 2d barcode detection using mathematical morphology," in ISMM, May 2013, pp. 1-13.

O. Gallo and R. Manduchi, "Reading 1d barcodes with mobile phones using deformable templates," IEEE Transactions on Pattern Analysis and Machine Intelligence, vol. 33, pp. 1834-1843, 2011.

S. Wachenfeld, S. Terlunen, and X. Jiang, "Robust recognition of 1-d barcodes using camera phones," in 19th International Conference on Pattern Recognition, IEEE, Dec. 2008, pp. 1-4.

* cited by examiner

PURCHASING ORDER

DETECTION AND IDENTIFICATION OF OBJECTS IN IMAGES

RELATED APPLICATIONS

The present application claims the benefit of priority under 35 USC 119 to Russian patent application No. RU2020102275, filed Jan. 21, 2020 with the Russian Patent Office. The present application is a divisional application of U.S. patent application Ser. No. 16/749,263, filed Jan. 22, 2020, whose entire content is incorporated by reference herein.

TECHNICAL FIELD

The implementations of the disclosure relate generally to computer systems and, more specifically, to systems and methods for detecting objects, such as barcodes, logos, text strings, and the like, in images, using neural networks.

BACKGROUND

Detecting text strings and various objects in an image of a document is a foundational task in processing, storing, and referencing documents. Conventional approaches for field detection may involve the use of a large number of manually configurable heuristics and may thus require many human operations.

SUMMARY OF THE DISCLOSURE

Implementations of the present disclosure describe mechanisms for detecting and identifying types of objects present in images of documents using neural networks. A method of the disclosure includes obtaining an image, wherein the image comprises an image of an object (IO), representing each element of a plurality of elements of the image via an input vector of a plurality of input vectors, each input vector comprising one or more parameters pertaining to visual appearance of a respective element of the plurality of elements of the image, providing, by a processing device, the plurality of input vectors to a first subnetwork of a neural network to obtain a plurality of output vectors, wherein each of the plurality of output vectors is associated with an element of the plurality of elements of the image, identifying, by the processing device, based on the plurality of output vectors, a sub-plurality of the plurality of elements of the image as belonging to the IO, and determining, by the processing device, based on locations of the sub-plurality of the plurality of elements, a location of the IO within the image.

A non-transitory machine-readable storage medium of the disclosure includes instructions that, when accessed by a processing device, cause the processing device to obtain an image, wherein the image comprises an image of an object, represent each element of a plurality of elements of the image via an input vector of a plurality of input vectors, each input vector comprising one or more parameters pertaining to visual appearance of a respective element of the plurality of elements of the image, provide the plurality of input vectors to a first subnetwork of a neural network to obtain a plurality of output vectors, wherein each of the plurality of output vectors is associated with an element of the plurality of elements of the image, identify, by the processing device, based on the plurality of output vectors, a sub-plurality of the plurality of elements of the image as belonging to the IO, and determine based on locations of the sub-plurality of the plurality of elements, a location of the IO within the image.

A system of the disclosure includes a memory, and a processing device operatively coupled to the memory, the processing device to obtain an image, wherein the image comprises an image of an object, represent each element of a plurality of elements of the image via an input vector of a plurality of input vectors, each input vector comprising one or more parameters pertaining to visual appearance of a respective element of the plurality of elements of the image, provide the plurality of input vectors to a first subnetwork of a neural network to obtain a plurality of output vectors, wherein each of the plurality of output vectors is associated with an element of the plurality of elements of the image, identify, by the processing device, based on the plurality of output vectors, a sub-plurality of the plurality of elements of the image as belonging to the IO, and determine based on locations of the sub-plurality of the plurality of elements, a location of the IO within the image.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 5 illustrates some exemplary connected graphs that represent identified objects, in accordance with some implementations of the present disclosure.

DETAILED DESCRIPTION

Figure 1:
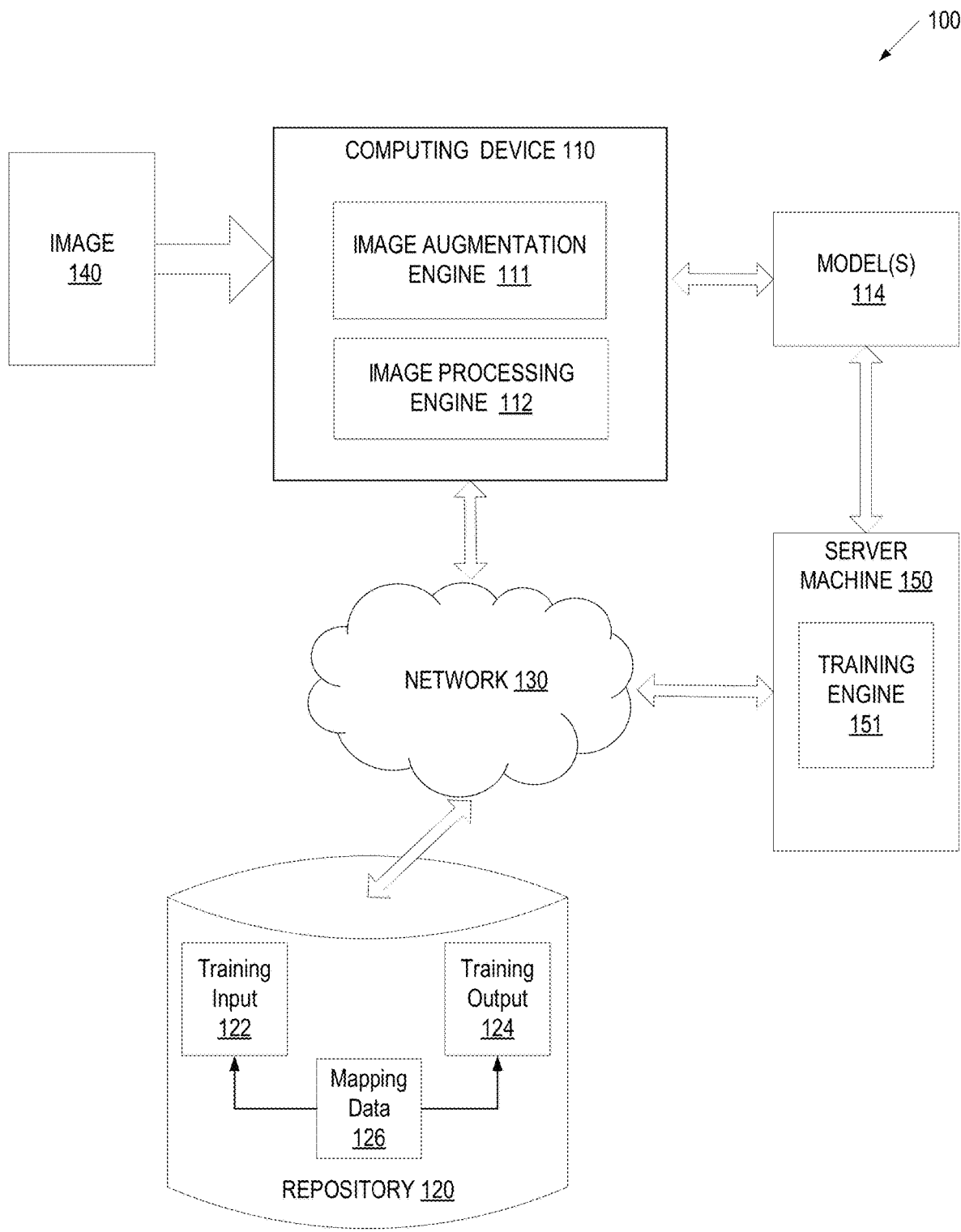
FIG. 1 is a block diagram of an example computer system in which implementations of the disclosure may operate.

Implementations for detecting objects and identifying types of detected objects in images using neural networks are described. A typical image may include a variety of objects, such as barcodes, logos, text strings, seals, signatures, and the like. The need for fast and accurate detection and recognition of objects in images arises, for example, in processing systems, such as postal tracking systems, merchandize-handling systems, docketing systems, banking systems, transportation systems, quality control systems, and many other applications. One conventional approach for identifying objects in images is based on heuristics. In the heuristic approach, a large number (e.g., hundreds) of documents, such as postal tracking slips, receipts, government forms, for example, are taken and statistics are accumulated regarding what objects can be present in such documents. For example, the heuristic approach can track what types of barcodes (e.g., QR barcodes or EAN barcoded) are frequently encountered in images and what are the likely locations of such barcodes (e.g., at the top or bottom of the image). The heuristic approach does not always work with a high accuracy, however, because if an object has an unusual location in a new image, the object may be mis-identified or even overlooked completely.

The conventional systems used in object recognition are often application-specific and do not work efficiently outside their target contexts. For example, a system designed to detect objects in manufacturing control applications may not work well for merchandize accounting. In particular, identification systems designed to recognize EAN barcodes may not work well for detection of QR barcodes and systems designed to recognize logos may not be very effective for recognizing seals or signatures.

One of the bottleneck challenges in designing effective multi-context object recognition systems/models is the need to obtain sufficiently large training sets in order to reliably train such models. An available set of historical (past) images often does not provide a sufficient diversity of training images to allow the trained model anticipate potential future variations. For example, a changed layout of a government form may have a barcode or a signature field moved to a new location, rendering prior training insufficient and requiring retraining the model.

Aspects of the present disclosure address the above noted and other deficiencies by providing mechanisms for designing highly effective multi-context object identification models as well as efficient training of such models based on training images synthetically augmented with images of training objects. The mechanisms described can use a relatively small number of base images by augmenting these base images with images of representative objects of interest placed at various locations within the base image. The images of the training objects can be tilted to a variety of angles. Additionally, the quality of the images of the objects can be modified (e.g., reducing contrast, brightness, sharpness, distorting colors of the object, and so on) in a controlled manner. As a result, even a small number of base images and images of the available training objects can potentially generate a significant number of training images that differ from each other by locations, tilts, image quality, color schemes, and so on, of the objects added to the base images. The objects are added in a way that achieves an effect of harmonious imprinting of the objects into the base image. Such realistic augmentation is achieved by adjusting intensity values of the pixels of the base images by taking into account the context and the visual appearance of the base image as well as the appearance of the objects (as opposed to simply replacing the pixels of the base images with the pixels of the objects). The harmonious object imprinting produces images in which artificially added objects may be indistinguishable from objects naturally imprinted at the time of the initial creation of the images.

Because a model can be trained on a variety of base images augmented with images of different objects of interest (various types of barcodes, logos, seals, text strings, handwritings, and the like), the same model can be capable of efficiently and quickly identifying the presence of various classes of objects in electronic images and further determining types of identified objects. As used herein, "class" refers to objects having different functionality. For example, objects may belong to the class "barcode," the class "seal," the class "logo," and so on. As used herein, "type" refers to encountered variations within each class. For example, an object identified as belonging to the class "barcode" may be of "EAN-13" type, "EAN-8" type, "QR" type, "UPC" type, and so on. An object identified as belonging to the class "seal" may be further determined to be of "notary public seal" type, "federal government seal" type, "local government seal" type, and so on.

As used herein, "image" may refer to any image accessible to a computing system. The image may be a scanned image, a photographed image, or any other representation of a document, a picture, a snapshot, a landscape, an outdoor or an indoor scene, a view, etc., that is capable of being converted into a data form accessible to a computer. In accordance with various implementations of the present disclosure, an image may conform to any suitable electronic file format, such as PDF, DOC, ODT, JPEG, etc. Although the image may be represented in an electronic (e.g., digital) file format, it is presumed that the image is not electronically partitioned and that the objects of interest are not vectorized (e.g., not specified in a digital form) in the electronic file.

"Document" may represent a financial document, a legal document, a government form, a shipping label, a purchasing order, or any other document that may have one or more objects of interest (e.g., both barcodes and signatures). "Document" may represent a document that is printed, typed, or handwritten (for example, by filling out a standard form). "Document" may be printed on a letterhead, sealed, signed, and so one. "Document" may represent a form document that has a variety of text fields (containing numerals, numbers, letters, words, sentences), graphics field (containing a logo or any other image), tables (having rows, columns, cells), and so on.

Some non-limiting examples of images in which object identification is performed may include images of documents that have a standard content (which may be mandated by official regulations or established business practices) but flexible distribution of this content within the document—mortgage/credit applications, real-estate purchase contracts, loan estimates, insurance contracts, police reports, purchasing orders, invoices, and so on. Documents may have objects of a given class that are encountered once or multiple times within the same image. For example, a form may have a shipping label barcode, a barcode used for internal docketing by the issuing organization, and a barcode for governmental tracking of the document. As another example, images may include be street view images while objects to be identified may be cars, people, animals, and so on.

The techniques described herein allow for automatic detection of objects in images using artificial intelligence. The techniques may involve training a neural network to detect objects of interest. In some implementations, after image (e.g., of a training or a target image) is processed by the neural network, the location of an object within the image may be identified. The neural network may be trained to detect multiple classes of objects concurrently. For example, various output channels of the neural network may output a location of an identified seal and a location of an identified signature. In some implementations, the identified objects may partially or completely overlap. For example, an official government seal may be placed on top of a signature of a government official. As another example, a signature of a public notary (or any other officer) may be handwritten in an appropriate field within the public notary's seal.

Furthermore, the neural network may have output channels configured to output indications of the type of an object, in addition to identification of the object as belonging to a particular class. For example, the trained network may identify an object of the class "seal" as belonging to a type "public notary seal." The neural network(s) may include multiple neurons that are associated with learnable weights and biases. The neurons may be arranged in layers. The neural network(s) may be trained on a training dataset of images that contain known objects belonging to known classes and types. For example, the training images may include examples of images containing one or more objects and an object-identifying information. The object-identifying information may be included in the training image (e.g., as a colored line around the perimeter of the object), in some implementations. In other implementations, the object-identifying information may be a metadata file accompanying the training image, e.g., a file containing the locations of the four corners of the bar code or a center and a radius of the seal.

The neural network may generate an observed output for each training input. The observed output of the neural network may be compared with a training output corresponding to the desired output as specified by the training data set, and the error may be propagated back to the previous layers of the neural network, whose parameters (e.g., the weights and biases of the neurons) may be adjusted accordingly (e.g., using a loss function). During training of the neural network, the parameters of the neural network may be adjusted to optimize prediction accuracy.

Once trained, the neural network may be used for automatic detection of objects and identification of types of the detected objects (by selecting the most probable type, as described in more detail below). The use of neural networks, as described herein, may alleviate the need for human operator involvement during the identification phase, improve the quality of detection, and provide a platform capable of detecting multiple classes and types of objects by performing object detection using a trained neural network in a way that takes into account a context of the entire image.

A neural network trained in accordance with implementations of this disclosure may be applied to identification of objects of various types on any appropriate images and may enable efficient object detection/type classification, thus improving both the accuracy of identification as well as the processing speed of an application implementing such identification.

FIG. 1A is a block diagram of an example computer system 100 in which implementations of the disclosure may operate. As illustrated, system 100 can include a computing device 110, a repository 120, and a server machine 150 connected to a network 130. Network 130 may be a public network (e.g., the Internet), a private network (e.g., a local area network (LAN) or wide area network (WAN)), or a combination thereof.

The computing device 110 may be a desktop computer, a laptop computer, a smartphone, a tablet computer, a server, a scanner, or any suitable computing device capable of performing the techniques described herein. In some implementations, the computing device 110 can be (and/or include) one or more computer systems 1000 of FIG. 10.

An image 140 may be received by the computing device 110. The image 140 may include any suitable text(s), graphics, table(s), including one or more characters (e.g., letters and/or numbers), words, sentences, etc. The image 140 may be of any suitable nature, such as a "government form," "shipping label," "invoice," "passport," "medical policy," "withdrawal slip," and so on.

The image 140 may be received in any suitable manner. For example, the computing device 110 may receive a digital copy of the image 140 by scanning a document or photographing a document, a scenery, a view, and so on. Additionally, in instances where the computing device 110 is a server, a client device connected to the server via the network 130 may upload a digital copy of the image 140 to the server. In instances where the computing device 110 is a client device connected to a server via the network 130, the client device may download the image 140 from the server or from the repository 120.

The image 140 may be used to train a set of machine learning models or may be a new image for which object detection and/or classification is desired. In some implementations, if used for training one or more machine learning models (neural networks) 114 for subsequent recognition, the image 140 may be appropriately prepared to facilitate training. For instance, in the image 140, text sequences and/or table elements may be manually or automatically selected, characters may be marked, text sequences/graphics/table elements may be normalized, scaled and/or binarized. In some implementations, text in the image 140 may be recognized using any suitable optical character recognition (OCR) technique.

In training of machine learning models 114, the image 140 may be a base image used to generate multiple training images. Specifically, in one implementation, the computing device 110 may include am image augmentation engine 111 to facilitate generation of training images based on a base image. The computing device 110 may further include an image processing engine to perform object identification and (optionally) object classification (among different types of objects) during the training and identification phases. The image augmentation engine 111 and the image processing engine 112 may include instructions stored on one or more tangible, machine-readable storage media of the computing device 110 and executable by one or more processing devices of the computing device 110. In one implementation, the image augmentation engine 111 and the image processing engine 112 may implemented as a single component. In some implementations, the image augmentation engine 111 may be absent on the computing device. For example, the image augmentation engine 111 may be located on the developer's machine, and may not be provided to the client's machine. More specifically, after the image augmentation engine 111 is used to generate training images to train one or more neural network models 114, the image processing engine (that incorporates the trained models 114) may be delivered to the customer without the image augmentation engine 111.

The image processing engine 112 (or the image augmentation engine 111, where appropriate) may pre-process any images prior to using the images for training of the machine learning models 114 and/or applying the trained machine learning models 114 to the images. In some instances, the trained machine learning models 114 may be part of the image processing engine 112 or may be accessed on another machine (e.g., server machine 150) by the image processing engine 112. Based on the output of the trained machine learning models 114, the image processing engine 112 may detect one or more objects within the images 140. The image processing engine 112 may further identify detected objects as belonging to specific types.

The image processing engine 112 may be a client-based application or may be a combination of a client component and a server component. In some implementations, the image processing engine 112 may execute entirely on the client computing device such as a server computer, a desktop computer, a tablet computer, a smart phone, a notebook computer, a camera, a video camera, or the like. Alternatively, a client component of the image processing engine 112 executing on a client computing device may receive an image and transmit it to a server component of the image processing engine 112 executing on a server device that performs the object detection. The server component of the image processing engine 112 may then return a recognition result (e.g., coordinates of one or more detected objects) to the client component of the image processing engine 112 executing on the client computing device, for further usage and/or storage. Alternatively, the server component of the image processing engine 112 may provide a recognition result to another application. In other implementations, the image processing engine 112 may execute on a server device as an Internet-enabled application accessible via a browser interface. The server device may be represented by one or more computer systems such as one or more server machines, workstations, mainframe machines, personal computers (PCs), etc.

Server machine 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The training engine 151 can construct the machine learning model(s) 114 for field detection. The machine learning model(s) 114, as illustrated in FIG. 1, may be trained by the training engine 151 using training data that includes training inputs and corresponding training outputs (correct answers for respective training inputs). The training engine 151 may find patterns in the training data that map the training input to the training output (the result to be predicted), and provide the machine learning models 114 that capture these patterns. As described in more detail below, the set of machine learning models 114 may be composed of, e.g., a single level of linear or non-linear operations (e.g., a support vector machine (SVM)) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the machine learning models 114 may include one or more neural networks as described in connection with FIG. 4.

The machine learning models 114 may be trained to detect images of objects embedded into or superimposed onto images 140 and to determine the most probable types for various detected objects in the images 140. The training engine 151 may generate training data to train the machine learning models 114. The training engine 151 (located on the server machine 150) may operate in combination with the image augmentation engine 111 (located on the computing device 110). For example, the computing device 110 may be a developer's computing device. The developer may have access to base images and to images of the training objects. The image augmentation engine 111 may combine a base image and one or more images of the training objects, perform processing of the combined images (as described below in relation to FIG. 2) and provide the resulting images (training data) to the repository 120 where in can be accessed by the training engine 151. The training data may be stored in the repository 120 and may include one or more training inputs 122 and one or more training outputs 124. The training data may also include mapping data 126 that maps the training inputs 122 to the training outputs 124. In some implementations, the mapping data 126 may include the listing of at least some of the objects (and their types) in the training inputs 122. For example, the mapping data may include the entry "barcode" and a listing of some (or all) objects (added by the image augmentation engine or already present in the base image) that belong to the class "barcode" within a specific training input image. The mapping data 126 may include spatial locations (any sets of coordinates that specify where the object is located within the training image) and, optionally, may further include the type of at least some of the objects. The training inputs 122 may include a variety of base images and a variety of modifications (augmentations) of the base images. The training outputs 124 may be classes and types of objects within the training inputs 122. During the training phase, the training engine 151 can find patterns in the training data that can be used to map the training inputs to the training outputs. The patterns can be subsequently used by the machine learning model(s) 114 for future predictions. The machine learning model(s) may be trained to look for specific objects that are of interest to the client (e.g., barcodes and postal stamps), but ignore objects of other classes (such as handwritten text strings).

The repository 120 may be a persistent storage capable of storing files as well as data structures to perform object recognition in accordance with implementations of the present disclosure. The repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other implementations content repository 120 may be some other type of persistent storage such as an object-oriented database, a relational database, and so forth, that may be hosted by a server machine or one or more different machines coupled to the via the network 130.

In some implementations, the training engine 151 may train one or more artificial neural networks (models 114) that each comprise multiple neurons to perform object detection in accordance with some implementations of the present disclosure. Each neuron may receive its input from other neurons or from an external source and may produce an output by applying an activation function to the sum of weighted inputs and a trainable bias value. A neural network may include multiple neurons arranged in layers, including an input layer, one or more hidden layers, and an output layer. Neurons from adjacent layers are connected by weighted edges. The edge weights are defined at the network training stage based on a training dataset that includes a plurality of images with known objects and classes of objects. In an illustrative example, all the edge weights may be initially assigned some random values. For every input 122 in the training dataset, the training engine 151 may activate the appropriate neural network (selection of the appropriate neural network may be performed by the image processing engine 112. The observed output of the neural network OUTPUT$_{NN}$ (TRAINING INPUT) is compared with the desired training output 124 specified by the training data set:

Compare: OUTPUT$_{NN}$ (TRAINING INPUT) vs. TRAINING OUTPUT.

The resulting error—the difference between the output of the neural network OUTPUT$_{NN}$ and the desired TRAINING OUTPUT is propagated back to the previous layers of the neural network, in which the weights are adjusted so as to modify the OUTPUT$_{NN}$ and make it closer to the TRAINING OUTPUT. This adjustment may be repeated until the output error for a particular training input 122 satisfies a predetermined condition (e.g., falls below a predetermined error). Subsequently, a different training input 122 may be selected, a new OUTPUT$_{NN}$ may be generated, a new series of adjustments may be implemented, and so on, until the neural network is trained to a sufficient degree of accuracy. In some implementations, this training method may be applied to training one or more artificial neural networks illustrated in FIG. 4.

Once the machine learning models 114 are trained, the set of machine learning models 114 can be provided to the image processing engine 112 for analysis of target images. For example, the image processing engine 112 may input a target image into the set of machine learning models 114. The image processing engine 112 may obtain one or more identification outputs from the set of trained machine learning models and may extract, from the identification outputs, classes, locations, and types of various objects whose images are present within the target image.

Figure 2:
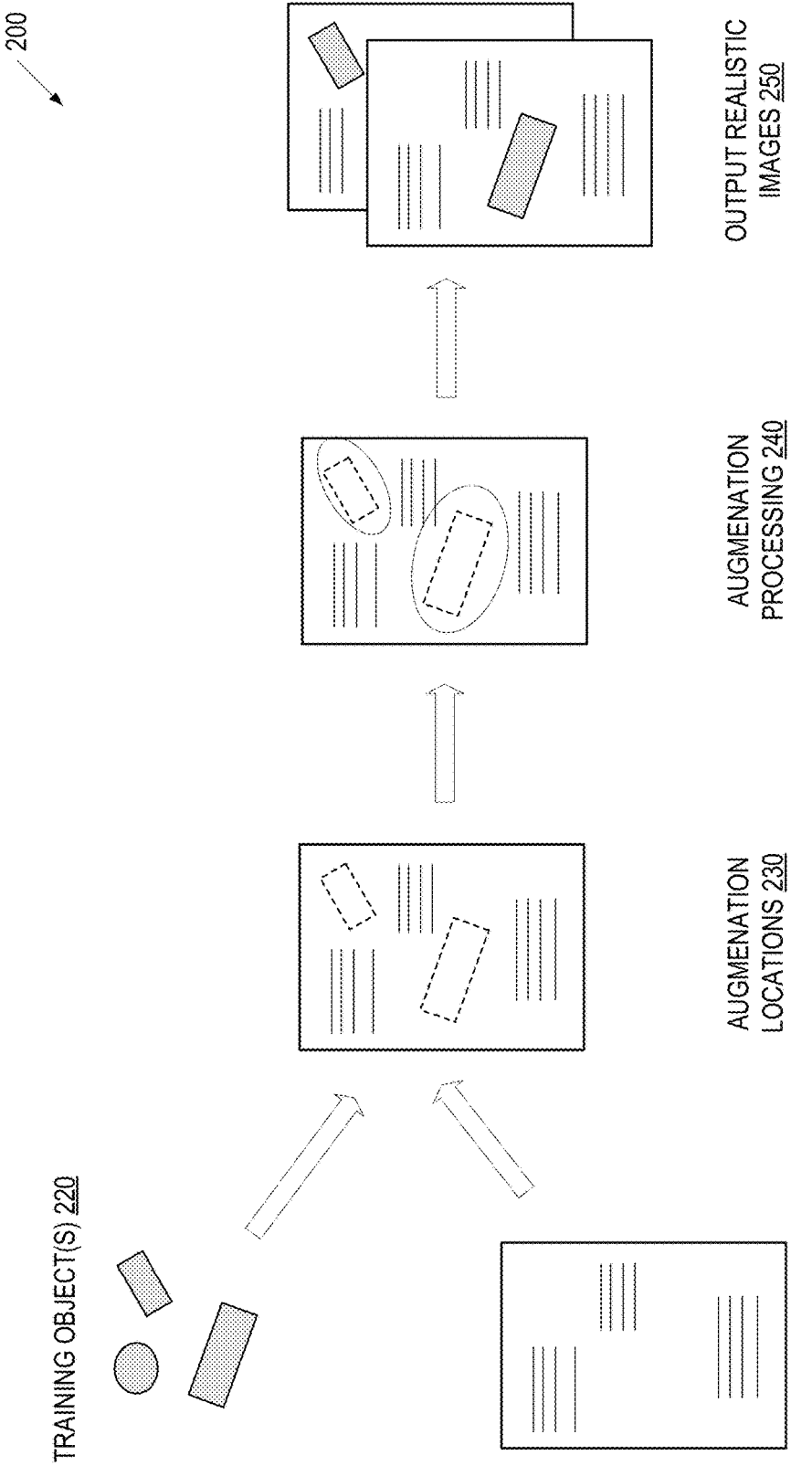
FIG. 2 is an exemplary illustration of an augmentation process of a base image to generate realistic images that may be used to train one or more neural networks operating in accordance with some implementations of the present disclosure.

FIG. 2 is an exemplary illustration of an augmentation process 200 of a base image to generate realistic images that may be used to train one or more neural networks operating in accordance with some implementations of the present disclosure. In an illustrative example shown in FIG. 2, a computer system implementing the techniques shown, may perform emulation of realistic images. The emulation process may involve inserting a training image of an object (a training object) into a base image, defocusing the image, introducing a digital noise, emulating pre-processing the image by the image-acquiring device (e.g., photo camera), blurring the image, and so on. Such image processing operations may yield an augmented set of images that incorporate the inserted training objects.

More specifically, as illustrated in FIG. 2, the image augmentation engine (IAE) 111 may acquire a base image 210, which may be any actual image or some artificially-prepared image. The base image may be obtained by analog or digital photography, scanning, video camera processing, etc. The base image 210 may be in any digital format accessible by a processing device. The base image 210 may be a black-and-white image or a color image. The color scheme used in the digital representation of the base image 210 may be RGB (red, green, blue) or CMYK (cyan, magenta, yellow, key) scheme, or any other scheme that allows efficient color differentiation. The base image 210 may be devoid of the objects that the neural network models are to be trained to differentiate. In some implementations, the base image 210 may already have some of the objects displayed therein. The base image may be rasterized into pixels. The pixels may have arbitrary size and shape. Rasterization may involve square pixels, triangular pixels, polygonal pixels, and so on. The size and shape of the pixels may be set by the IAE 111, in those instances where the IAE 111 causes the base image 210 to be acquired and/or converted into a raster image. In some implementations, the size and shape of the pixels may already be fixed, for example, by a device that performed rasterization before the base image was obtained by the IAE 111. Each pixel may be characterized by one of more intensity values. For example, a black-and-white image may have one intensity value per pixel, ranging between 0 (white pixel) and 1 (black pixel), in one implementation. Similarly, an RGB image may have intensity values for each color ranging between 0 (no presence of a given color) to 1 (a compete intensity of the respective color), with the sum of the three intensity values adding up to the maximum value of 1, in some implementations. In such implementations, the values 0.33 for each of the three colors may represent a white color while all values 0 may represent a black color. In a CMYK image, there may be 4 intensity values with the values 0 representing the white color.

The IAE 111 may also acquire one or more images of the training objects 220. The training objects 220 may be barcodes, seals, text strings, logos, or any other objects that the neural network model are to be trained to detect. The training objects 220 may be represented by analog images converted into a digital format (e.g., by rasterization), in some implementations. In other implementations, the training objects may be represented by digital images (e.g., images originally created using vector graphics). In some implementations, the IAE 111 may perform rasterization of the digital images using the same (or similar) rasterization format as used in the base image 210.

The IAE 111 may then determine augmentation locations 230 for placing one or more images of training objects 220 within the base image 210. In some implementations, the objects are to be inserted into the locations of the base image that are sufficiently large to accommodate the object without causing the object to overlap with other graphics or text elements of the base image 210. To determine the locations that are sufficiently large to accommodate a training object, the IAE 111 may analyze the background of the image. For example, the IAE 111 may determine the dominant color or intensity (e.g., white or gray, or any other color) that has the largest presence in the base image 210. In some implementations, pixels having intensities that differ by a certain predetermined amount may be considered of the same color. For example, after scanning, a white color may appear as a light gray, due to artefacts and limitations of scanning.

In some implementations, the background may be determined based on a color histogram of the image or on multiple color histograms for various parts of the image. In some implementations, the training object may be inserted into the base image 210 regardless of the local environment, to emulate instances where a seal or a stamp is placed upon other elements of an image.

After identifying potential locations for insertion of the images of the training objects 220, the IAE 111 can perform augmentation processing 240. Each of the identified locations can potentially serve as a location for insertion of the image of the training object 220. Insertion can be performed so that the images of the training objects make various angles with a reference axis (e.g., a horizontal axis) of the base image 210. In some implementations, the pixels of the base image 210 may be replaced with the pixels of the image of the training objects 220. Such replacement, however, may produce training images that lack harmonious integration of objects into the base image. For example, pixels of the training objects 220 may have higher (lower) intensity values than pixels of the base image 210. To address this problem, the IAE 111 may adjust the intensity values of the inserted pixels based on a reference intensity value of the base image 210. For example, the reference value may be an average intensity value of (non-background) pixels of the base image 210 or of some part of the base image 210, such as some vicinity (e.g., a pre-determined fraction of the base image) of the selected augmentation location 230. In some implementations, a reverse procedure can be implemented. Namely, instead of replacing pixels of the base image 210 with pixels of the training objects 220 and adjusting the latter in view of the intensity values of the former, the IAE 111 may adjust the pixels of the base image 210 in view of the intensity values of the pixels of the images of the training objects 220.

More specifically, suppose that the base image 210 has pixels that have the maximum intensity value 0.6 whereas the pixels of the training objects 220 have the maximum intensity value 0.9. Simply replacing the base image pixels with the pixels of the training objects may result in the augmented training image where a part of the image is 50% darker than the rest of the image. Such training image may "give away" the location of the object and, therefore, be ineffective for training of the neural network models 114. Instead, the pixels of the base image 210 may be adjusted (e.g., darkened, lightened) based on the intensity values of the pixels of the training object 220. For example, if pixel $P_O$ of the object is to be placed where pixel $P_B$ of the base image is currently located, the intensity value $S_O$ of pixel $P_O$ may be determined. If the pixel is white ($S_O=0$), or below a certain minimum value, pixel $P_B$ may not need to be modified. (This corresponds to a situation where, e.g., pixel $P_O$ is a white pixel that happens to be between dark lines of the barcode—this preserves the original appearance of pixel $P_B$ of the base image.) If pixel $P_O$ of the training object has non-zero intensity value $S_O$, the intensity value of pixel $P_B$ may be adjusted (increased) in view of the intensity value $S_O$ according to the formula: $S_B \rightarrow S_B + S_O \times (0.6/0.9)$, in one exemplary implementation. In other implementations, various other adjustment formulas (e.g., based on non-linear functions) may be used instead. A person skilled in the art will appreciate that there is a virtually unlimited number of possibilities to adjust a intensity value of a pixel of the base image using the intensity value of the corresponding pixel of the image as a weighting parameter.

The above-described method of harmonious augmentation of base images with mages of training objects may also be applied to color images (either to base images or images of the training objects). More specifically, adjustment of intensity values for each color of a pixel $P_B$ may be performed based on the intensity value of the respective color for the corresponding pixel $P_O$. For example, if scanning of the base image resulted in a magenta color having a intensity value 0.1, the same magenta intensity value 0.1 may be added to the (weighted) intensity value of the magenta color of the pixels of the image of the training object. In those implementations, where RGB color scheme is used, the white background may correspond to a complete intensity of each color. In such implementations, the intensity values may be subtracted (rather that added, as in where the CMYK color scheme is used). For example, in a scheme where the white color has intensity value S=1 and the black color has intensity value S=0, the maximum darkness of pixels of the base image 210 may correspond to the intensity value 0.3 whereas pixels of the training object 220 may have the maximum darkness that corresponds to the intensity value 0.1. To ensure that the image of the training object 220 is harmoniously integrated into the base image 210, the IAE 111 may adjust the intensity value $S_B$ of the base image pixel based on the intensity value $S_O$ of the respective pixel of the training object according to a formula such as, $S_B \rightarrow S_B - (1 = S_O) \times (1-0.3)/(1-0.1)$, As a result of the augmentation processing 240, the IAE 111 may output numerous realistic training images 250 even if only a small number of base images 210 is available initially. Additional output images 250 may be obtained by further post-processing in of the output images. For example, in some implementations, the IAE 111 may de-contrast some of the generated images, e.g., by reducing the maximum difference in the intensity of various pixels of the generated training images by a pre-defined value, e.g., 0.1 or 0.2 of the initial maximum difference. In some implementations, the IAE 111 may simulate an additional light source in the imaged scene, by additively applying, to at least a subset of the image pixels, a Gaussian noise of a low amplitude, thus emulating gradient transitions between more saturated and less saturated parts of the training images. In some implementations, the IAE 111 may partially de-focus the image, e.g., by applying a Gaussian blur with a pre-defined or dynamically adjustable radius, which may be selected from a pre-defined or dynamically adjustable range. In some implementations, the IAE 111 may superimpose a motion blur on the image, thus simulating movement of the imaged objects within the exposure time determined by the shutter speed. In some implementations, the IAE 111 may apply, to at least a subset of the training image pixels, a simulated digital noise, such as Gaussian noise of a pre-defined or dynamically-adjustable amplitude. In some implementations, the IAE 111 may simulate artefacts added by a camera, e.g., by applying a sigma filter to at least a subset of the image pixels. In some implementations, the IAE 111 may apply a Gaussian blur with a pre-defined or dynamically adjustable sigma value. In some implementations, the IAE 111 may introduce noise, i.e., random variations of intensity values for various colors. In some implementations, the IAE 111 may introduce lines or streaks, to simulate various scanning artefacts.

The output realistic images 250 may be associated with mapping data (e.g., the mapping data 126). The mapping data may include identifications of added images of the training objects 220, such as the coordinates of the added images. The mapping data may further identify the classes and types of the added images. For example, the mapping data may index added objects by class/type and provide the coordinates of a bounded box (or any other geometric shape, such as a circle, an oval, or a polygon) encompassing the object.

After the image processing engine (IPE) 112 may use the realistic training images 250, generated by the IAE 111, to train model(s) 114, the model(s) 114 may be capable of finding and identifying objects in training images 250 as well as in target images that have not been used in training. In training, the artificially prepared training images 250 may be used together with real images that has not been augmented. In some implementations, only real images may be used. In some implementations, only artificially augmented images may be used. In some implementations, using artificially augmented images may decrease the need, efforts, and expenses required to obtain a sufficient number of training images. Supplementing a set of training images with augmented images may be advantageous since it allows to generate a significant number of training images even starting from a relatively small number of available real images.

Figure 3:
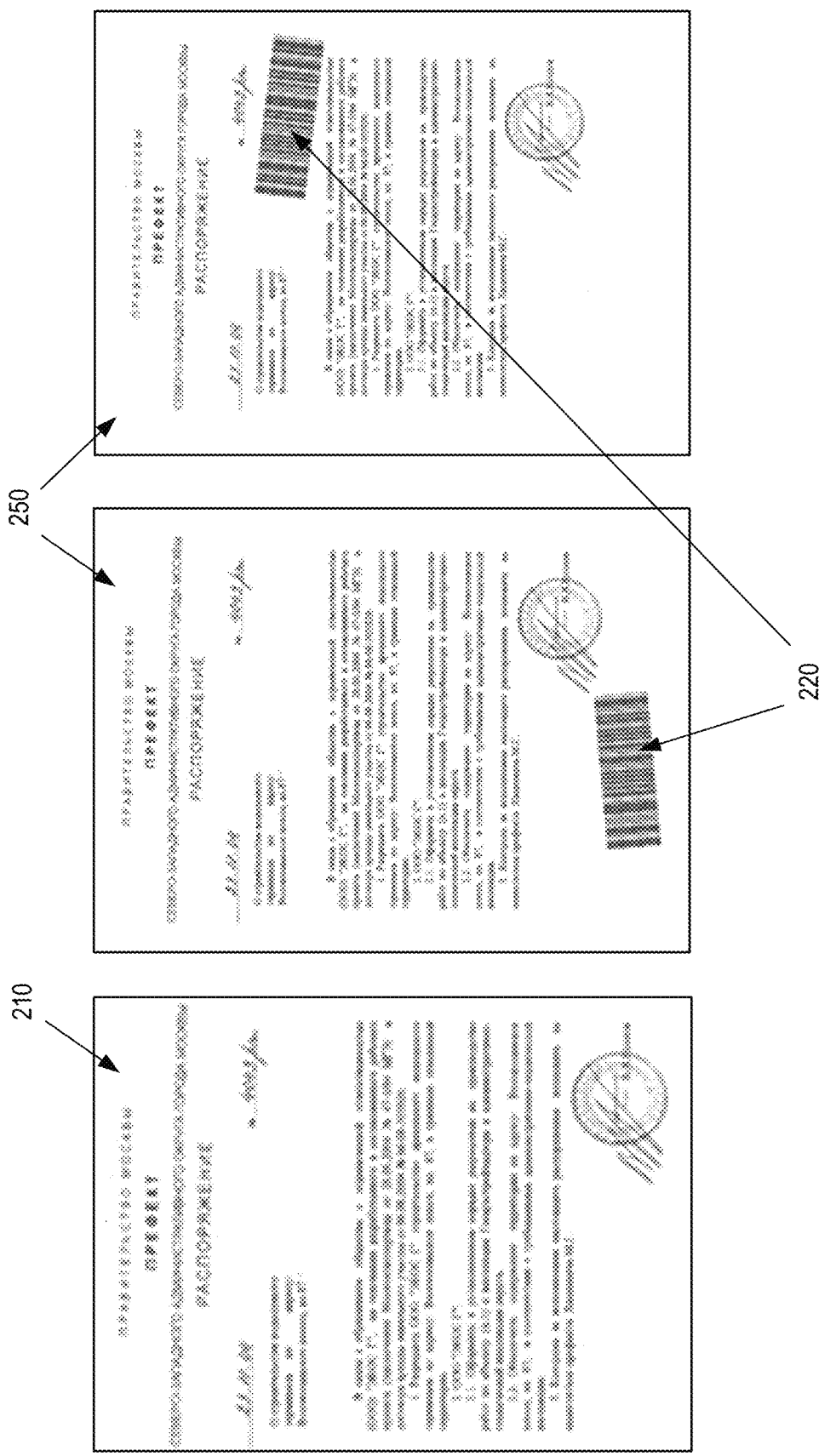
FIG. 3 is an exemplary illustration of training images obtained by augmenting a base image with images of a training object, in accordance with some implementations of the present disclosure.

FIG. 3 is an exemplary illustration of training images obtained by augmenting a base image with images of a training object, in accordance with some implementations of the present disclosure. Shown is a base image 210 (left pane) which has various objects, such as a variety of text strings of different fonts, a letterhead, a signature, an official seal, and so on. After identifying regions of the background of the base image 210, the IAE 111 has inserted an image of a training object (barcode) 220 into a location at the bottom of the base image (center pane) and into a location at the top of the base image (right pane).

Figure 4:
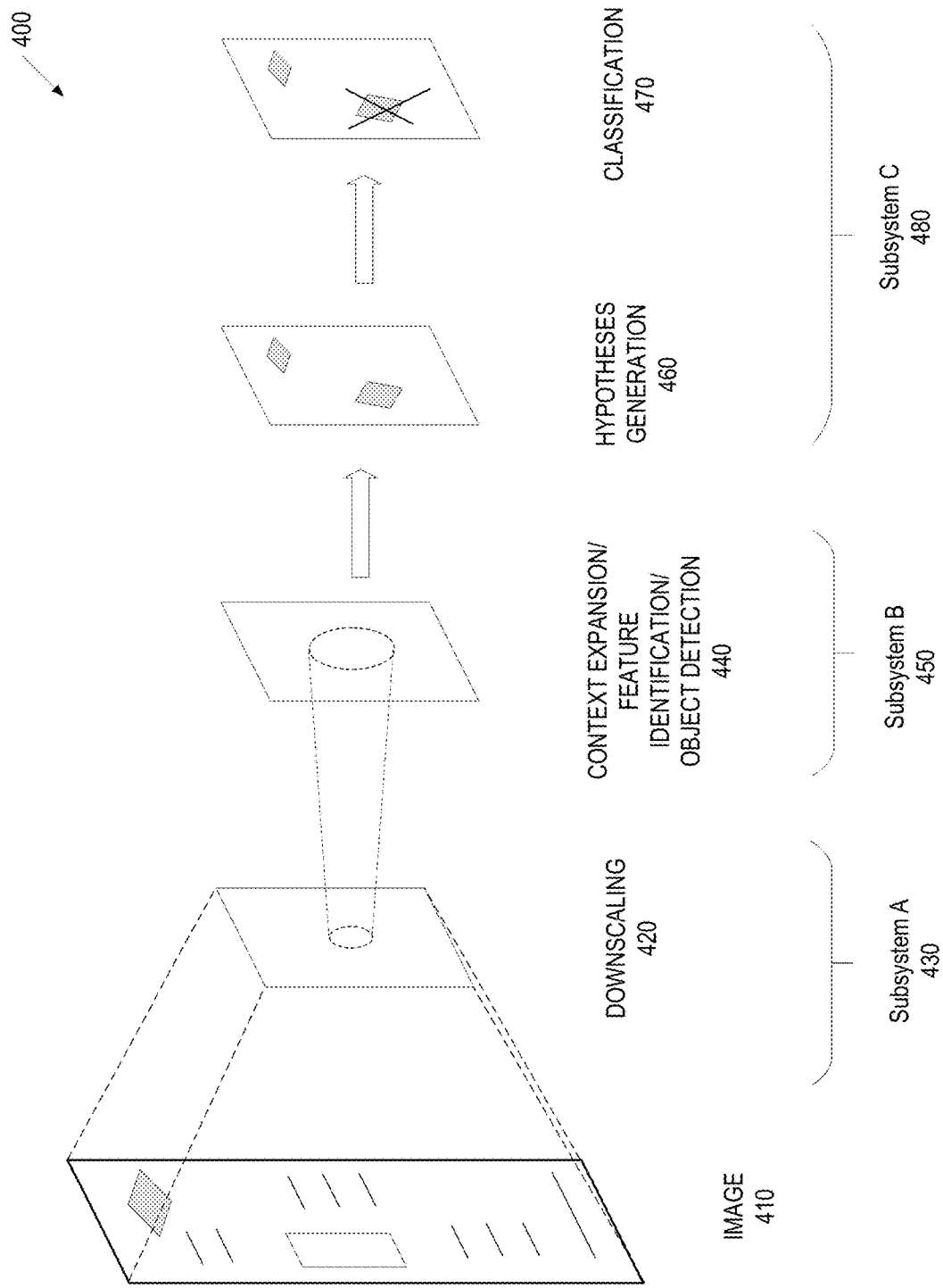
FIG. 4 is a schematic diagram illustrating an example neural network system that may be capable of detecting objects and identifying types of detected objects in images, in accordance with some implementations of the present disclosure.

FIG. 4 is a schematic diagram illustrating an example neural network system 400 that may be capable of detecting objects and identifying types of detected objects in images, in accordance with some implementations of the present disclosure. The neural network system 400 may include multiple neurons that are associated with learnable weights and biases. The neurons may be arranged in layers. Some of the layers may be hidden layers. As illustrated, the neural network system 400 may include a subsystem A 430, a subsystem B 450, and a subsystem C 480. Each of the subsystems 430, 450, and 480 may include multiple neuron layers and may be configured to perform one or more functions for object detection in accordance with the present disclosure.

The input into the IPE 112 may be one or more images 410. If images are in a physical format (e.g., paper, film, etc.), the IPE 112 or the computing device 110 (or the server machine 150) may obtain physical images (e.g., photographs) and convert the obtained images into digital images (e.g., by scanning) belonging to some digital format (JPEG, TIFF, GIG, BMP, CGM, SVG, and so on).

The imaging may occur immediately before the image 410 is processed by the neural network system 400, in some implementations. In other implementations, the imaging may occur at some point in the past, and the image 410 may be obtained from a local or network (e.g., cloud) storage. The image 410 may undergo rasterization to represent the image 410 via a number of pixels. The number of pixels may depend on the resolution of the image, e.g., an image may be represented by 4096×2048 pixels. Each pixel may be characterized by one or more intensity values. A black-and-white pixel may be characterized by one (k=1) intensity value representing the darkness of the pixel, with value 0 (or 1, as in the inverted scheme) corresponding to a white pixel and value 1 (or 0) corresponding to a black pixel. The intensity value may assume continuous (or discretized) values between 0 and 1 (or between any other chosen limits). Similarly, a color pixel may be represented by more than one intensity values, e.g., by three (k=3) separate intensity values for red, green, and blue colors, in one implementation. In other implementations, the number of intensity values may be different, e.g., there may be four values (k=4), if the CMYK color encoding scheme is used.

In some implementation, the neural network system 400 may optionally perform downscaling 420 of the image resolution. For example, some objects, such as barcodes, may have a sufficiently large size so that even a lower-resolution processing may be capable to detect such objects successfully, while reducing computational time significantly. To perform downscaling 420, the IPE 112 may combine pixels into larger elements (superpixels, tiles) whose dimensions may be n×m pixels. In some implementations, the elements may be squares (n=m). For example, elements having 4×4 pixels may be used, so that the original representation of the image in terms of 4096×2048 pixels may be downscaled to a representation in terms of 1024×512 elements (superpixels). In some implementations, if high resolution is required, downscaling 420 may not be performed. In such implementations, an element may represent a single pixel.

The downscaling 420 may be performed by a subsystem A 430 of the neural network system 400. The subsystem A 430 may be trained as described above. Depending on the type of the object to be detected, each element with coordinates (x,y) may be described by a vector vec(x,y) having an appropriate (for the type of the detected object) number of components. The vector vec(x,y) may pertain to the visual appearance of the element (x,y). The vector vec(x,y) may include components that describe average intensity values for each color of the pixels of the element. Additionally, the vector vec(x,y) may include other components that may describe variations and/or correlations of intensity values of the pixels of the element (x,y), and so on. The vector vec(x,y) may have a number of components N ranging from one to the total number of intensity values, k×n×m, of all the underlying pixels of the element. For efficient downscaling, it may be optimal to keep the number of components lower the total number of intensity values, k×n×m, but nonetheless above the number of colors k. This may allow the subsystem A 430 to construct vectors that describe the elements in more detail than merely using some average intensities of the constituent pixels, while at the same time keeping the number of parameters sufficiently low to allow efficient processing by other components of the neural network system 400. The number of parameters may be adjusted based on the performance of the trained system 400, on the expert feedback, and/or on the anticipated processing capabilities of the client computing systems. For example, if the trained system 400 is to be used on a low-power processor of the client device, the number of components N may be limited accordingly, to balance speed of processing against the accuracy of object detection for that specific device.

The component of the vec(x,y)=$(z_1, z_2, \ldots z_N)$ may be computed from the number k×n×m of the intensity values of the constituent pixels using learnable weights and biases of standard methods of machine learning. Specifically, training of the subsystem A 430 may be performed by comparing actual outputs of the subsystem A 430 with the desired training outputs, backpropagation the observed differences and adjusting the weights and biases until the observed differences are minimized. For example, the subsystem A 430 may utilize one or more matrix filters whose parameters (matrix elements, depth, stride, and so on) may be adjusted during the training process. The subsystem A 430 may use a plurality of neuron layers, such as an input layer, an output layer, and one or more hidden layers. The subsystem A 430 may be a convolutional network (CNN) that outputs a lower number of channels (N for each element) than the number of the input channels (k×n×m for each element). The subsystem A 430 may vary element size, the number of components N of the vectors vec(x,y), and the number of learnable parameters for each of the objects that are to be detected by the neural network system 400.

The output of the subsystem A 430—the set of vectors {vec(x,y)}—may be processed for object detection (operation 440) using one or more neural layers that are configured to account for the context of the entire image (or at least a part of the image that includes many elements). The neural layers that perform context expansion/object detection may be joined into a subsystem (subnetwork) B 450. It shall be understood that the subsystem B 450 may be integrated with the subsystem A 430, and that the separation between the subsystem A (subnetwork) 430 and the subsystem B 450, schematically indicated in FIG. 4, is only for the ease of description and understanding. The subsystem B 450 may take the vectors vec(x,y)=($z_1$, $z_2$, . . . $z_N$) as an input and generate vectors VEC(x,y)=($Z_1$, $Z_2$, . . . $Z_M$) as an output. The output vectors VEC(x,y)=($Z_1$, $Z_2$, . . . $Z_M$) may be output for each element (x,y) of the image 410. In some implementations, where multiple classes of objects are being detected, multiple vectors VEC(x,y) may be associated with each element (x,y), one vector for each detected class. The description below, if not indicated otherwise, shall be understood to apply to each one of the classes of objects, which may be detected independently (e.g., in parallel). The number of components M in the output vectors VEC(x,y)=($Z_1$, $Z_2$, . . . $Z_M$) may be different from the number of components N in the input vectors vec(x,y)=($z_1$, $z_2$, . . . $z_N$). The output vectors VEC(x,y) may have a different meaning compared with the input vectors vec(x,y). For example, whereas the input vectors may describe visual appearance of the respective element (x,y), the output vectors may describe context of the element (x,y) within the image, including, for example, a likelihood of the element (x,y) belonging to a particular object or background.

As a consequence of the architecture of the subsystem B 450 described in more detail below, the output vectors VEC(x,y) may account for the context of the entire image or at least a part of the image. The subsystem B 450 may include a number of neural layers. An input layer of the subsystem B 450 may accept a number of channels that input vectors vec(x,y) within each channel's dedicated receptive field. The receptive fields of the first layer of the subsystem B 450 may include relatively small number of elements. For example, a size of the receptive field of the input layer may be 8×8 elements (4×4 elements, 4×8 elements, and so on). As the first layer processes the input vectors vec(x,y) and provides a set of intermediate vectors to the second (third, and so on) layers of neurons of the subsystem B 450, the size of the receptive field may increase to 32×32 elements or more. This means that a vector characterizing the element (x,y) is recalculated based on the context of the progressively (with each additional layer of neurons) wider part of the image 410. In some implementations, the maximum size of the receptive field (e.g., the size achieved in the last layer of the subsystem B 450) may be a full size of the image 410, or a significant portion of the image (such as a half or a quarter of the image, or some other portion of the image). The number of layers as well as the sizes of the initial and the final receptive fields may depend on the class of the object being detected. For example, in cases of detecting a seal, the subsystem B 450 may use five layers of neurons, whereas for barcode detection the subsystem B 450 the vectors VEC(x,y) may be determined by the output of the fourth layer, so that the last layer of neurons may be unused in barcode detection.

The output vectors VEC(x,y) may describe various features and contexts of the element (x,y) within the image 410. For example, the first component $Z_1$ of the output vector VEC(x,y)=($Z_1$, $Z_2$, . . . $Z_M$) may describe a likelihood that the element (x,y) belongs to an object of a detection class. For example, the value of the first component $Z_1$>0.5 may indicate that the element (x,y) belongs to an object, whereas the value of the first component $Z_1$<0.5 may indicate that the element (x,y) does not belong to an object (e.g., belongs to the background). The threshold value may be different from 0.5 and may depend on the implementation, on the class of the object being detected, and so on. The remaining components $Z_2$, . . . $Z_M$ of the output vector may contain additional information about the likelihood that the element (x,y) belongs to a particular type among the types belonging to the class which has been identified in view of the first component, $Z_1$.

The elements (x,y) that have been identified by the IPE 112 as having the first component $Z_1$ satisfying the threshold condition may be considered as a set of elements belonging to the identified object. Such a set of elements may be represented by a connected component (graph). For example, two graph vertices (elements of the image) may be viewed as closely connected if their distance to each other (horizontal, vertical, diagonal, and so on) does not exceed a pre-set value (e.g., no more than 3 elements apart). A graph may be considered connected if for any two vertices of the graph there exists a path that starts at one vertex and ends at the other vertex while passing over closely connected vertices. In other words, if there are two (or more) closely connected sets of elements, which are separated by a large distance, such sets may be considered as not belonging to a connected graph (e.g., representing two separate objects).

Figure 6:
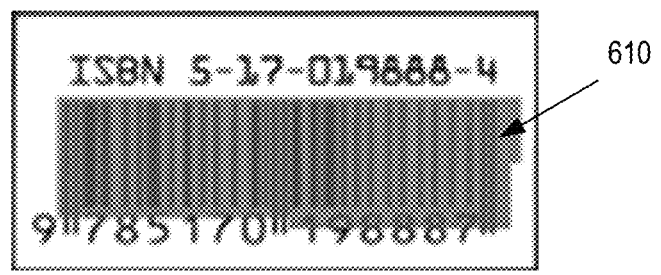
FIG. 6 illustrates exemplary outputs of the neural network system identifying barcodes within images, in accordance with some implementations of the present disclosure.
Figure 6:
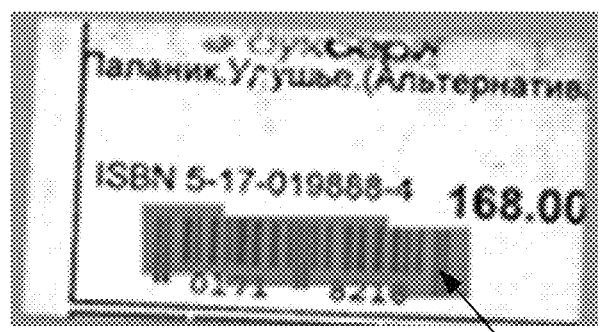

FIG. 5 illustrates some exemplary connected graphs that represent identified objects, in accordance with some implementations of the present disclosure. Depicted schematically are identified objects, in terms of their element (superpixel) representation. The first components $Z_1$ of the output vectors, VEC(x,y), are displayed. For brevity and conciseness, the first components are rounded to the nearest integer value (e.g., the value 0.3, indicating that the element belongs to the background, is rounded to zero whereas the value 0.7, indicating that the element belongs to an object, may be rounded to 1). The connected graph 510 has a bounded polygon (rectangle) drawn around the connected graph therein. The connected graph 520 has a bounded polygon (of non-rectangular shape) drawn around the connected graph therein. Both graphs 510 and 520 have all elements inside the respective polygons belonging to the class of "object" (as indicated by the respective number 1). In contrast, the connected graph 530 has a rectangle drawn around the connected graph in which not all of the elements may have been identified as belonging to the class "object." Nonetheless, the IPE 112 may identify the outside rectangle—as a polygon of a minimum area—as a bounding box for the identified object. In some implementations, a bounding box may be a circle or an oval. After a set of the connected graphs is identified, the subsystem B 450 may output identified graphs (and their bounding boxes). FIG. 6 illustrates exemplary outputs 600 of the neural network system 400 identifying barcodes within images, in accordance with some implementations of the present disclosure. As illustrated in FIG. 6, the neural network system 400 has successfully determined polygons 610 and 620 encompassing the barcodes in an image.

With a continued reference to FIG. 4, the vectors VEC (x,y)=($Z_1$, $Z_2$, . . . $Z_M$) and the connected graphs (which correspond to the identified objects belonging to the detected class) output by the subsystem B 450 may be used to determine a type to which the identified object(s) belong. In one implementation, such determination may be performed by the IPE 112 inputting the vectors VEC(x,y) into a subsystem C 480. In some implementations, the IPE 112 may use hypotheses generation (operation 460) and classification (operation 470) to determine a most probable type of the detected object. The subsystem C 480 may have one or more fully-connected/dense neuron layers. Some of the fully connected layers may use a softmax function. One or more fully-connected layers of the subsystem C 480 may be connected to each other by layers that are not fully-connected, in some implementations.

The subsystem C 480 may process the vectors VEC(x,y) through one or more neural layers and determine a value $W_j(x,y)$ reflecting the likelihood that the element (x,y) belongs to an object of type j. For example, $W_1(x,y)$ may describe the likelihood that the element (x,y) belongs to a barcode of the QR type. $W_2(x,y)$ may describe the likelihood that the element (x,y) belongs to a barcode of the EAN-13 type. $W_3(x,y)$ may describe the likelihood that the element (x,y) belongs to a barcode of the EAN-8 type and so on. The values $W_j(x,y)$ may be normalized probabilities, in some implementations, so that the sum of values $W_j(x,y)$ for all possible (e.g., recognized by the trained model) types of objects is $\Sigma_j W_j(x,y)=1$. In other implementations, the values $W_j(x,y)$ may not be normalized, but the higher (lower) values of $W_j(x,y)$ may nonetheless indicate a higher likelihood of the detected object belonging to a given type of objects than the lower (higher) values of $W_j(x,y)$ would so indicate.

Having determined the likelihoods $W_j(x,y)$ for each of the elements of a polygon identified by the subsystem B 450, the subsystem C 480 may generate one or more hypotheses that the object represented by the identified polygon belongs to one of the known types. (Hereinafter, the term "polygon" is to be understood to include any figure—such as a circle or an oval—that encompasses the elements of the identified object.) The likelihood $W_j$(object) that the polygon represents an object that belongs to the type j may be determined based on the likelihoods $W_j(x,y)$ of its constituent elements. In some implementations, the likelihood $W_j$(object) is determined as the average value of the values $W_j(x,y)$ for all the elements (x,y) of the polygon. In some implementations, the likelihood $W_j$(object) is determined as a weighted average of the values $W_j(x,y)$ for the elements of the polygon with different elements having unequal weights. For example, in one implementation, the outer elements (x,y) may be given lower (or higher) weights. Different weighting schemes may be used for different types of objects. For example, for types of objects belonging to the class "signature," outer elements (such as elements located near the bounding polygon) may be given lower weights. On the other hand, for types of objects belonging to the class "seal," which are expected to have a distinct outer line, outer elements may be given higher weights. In some implementations, the weights are fixed (e.g., by a software developer). In some implementations, the weights are the parameters of the subsystem C 480 that were optimized during the training process.

After determining the likelihoods $W_j$(object) for all (or at least some of) the known types of objects, the IPE 112 may select the type j having the maximum likelihood. In some implementations, this may be done by the subsystem C 480 applying a softmax function (e.g., operation 470) to the output likelihoods $W_j$(object). The identified class of the object (e.g., "barcode"), together with the determined type of the object (e.g., "QR barcode") may be output (e.g., provided to a user of the computing device 110, stored in a storage device, transmitted over the network 130) by the neural network system 400. Additionally, the neural network system 400 may output coordinates of the identified object. For example, the coordinates may include coordinates of the vertices of the bounding polygon of the object or any other identifiers that identify the location of the object (e.g., a radius of the bounding circle together with the coordinates of the center of the circle). Because the size of the downscaled image may be reduced (during downscaling 420), the coordinates (x,y) of the identified elements may need to be rescaled to the original image scale, (x,y)→(X,Y). For example, if the size of the element (superpixel) is n×m pixels, the rescaling may be performed as follows: (x,y)→(X=nx,Y=my). In some implementations, the rescaling may be performed after the determination of an object is completed but prior to identification of the type of the object (in instances where the type is being identified). In some implementations, the rescaling may be performed after the identification of the type of the object.

Some of the components illustrated in FIG. 4 may be combined. For example, subsystems A, B, and C may be realized as a single neural network, in one implementation. In some implementations, subsystems A and B may be realized as a single network while subsystem C may be realized as a separate network. Similarly, in some implementations, subsystems B and C may be realized as a single network while subsystem A may be realized as a separate network. In those implementations where multiple subsystems are realized by a combined single network, the functions of different subsystems in the combined network may be implemented by separate dedicated layers or by shared layers, or by some combination thereof.

Figure 7:
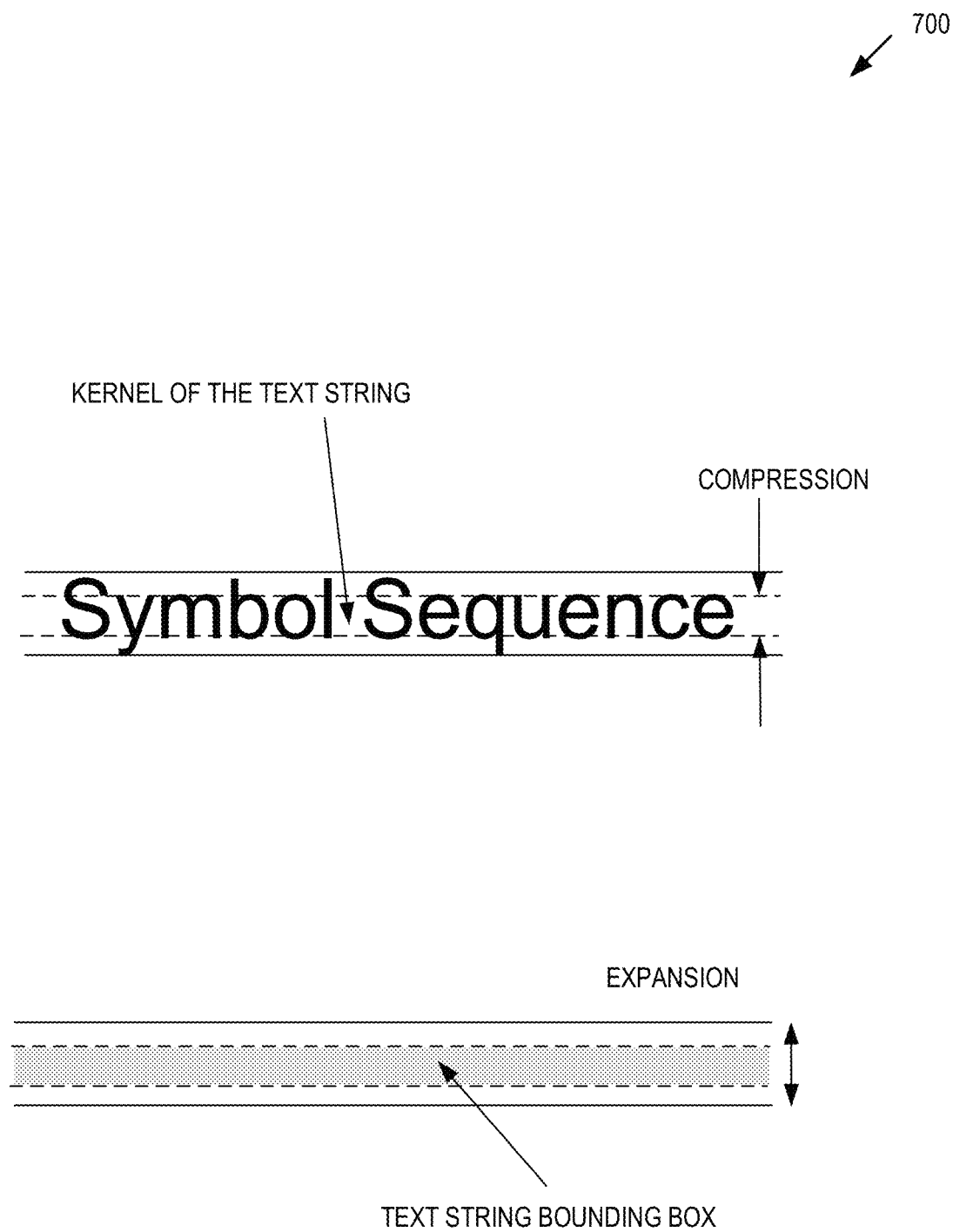
FIG. 7 is a schematic illustration of a compression-expansion approach to detecting text strings in images, in accordance with some implementations of the present disclosure.

FIG. 7 is a schematic illustration of a compression-expansion approach to detecting text strings in images, in accordance with some implementations of the present disclosure. A typical image may contain multiple instances of lines of text that may be separated by background spacings (e.g., vertical spacings) whose sizes may be comparable with the width (e.g., vertical width) of the lines of text themselves. Determining separate bounding boxes (polygons) for each separate line of text, therefore, may be a challenging task, if a line-by-line resolution of the image is required. FIG. 7 illustrates one possible approach to high-resolution detection of text strings that avoids undesired clumping (merging) of different lines/strings into a single detected object and facilitates individualized line/string detection.

A typical symbol sequence (e.g., a sequence of words, numerals, glyphs, etc.), as illustrated by the top picture in FIG. 7, can be treated as a high-density central region—kernel—shown schematically as the region between two horizontal lines, and an outside region—margin—which only contains occasional pixels (such as pixels belonging to top and bottom tails of symbols, top parts of capital letters, and the like). To take advantage of such separation of a typical text line/string into a kernel and a margin, lines/strings may be ignored during training of the neural network system 400, so that only kernels are used to train the neural network system 400. For example, in one possible implementation, only the kernels of training text strings are marked up (identified) as training inputs. The kernel may be assumed to constitute 40% of the total text string, with 30% margins on both sides ignored (a 30/40/30 scheme), in one non-limiting implementation. Any other margin/kernel/margin compression scheme may be used, such as 25/50/25 or 20/45/35 scheme, or any other scheme (the scheme applied may depend on the language used in the text of training and target images, on typical typesets, and so on).

A neural network system trained on compressed text lines/strings with margins removed may be capable of more accurately detecting lines of text (including efficiently separating the lines along the vertical direction). During the identification phase (illustrated schematically by the bottom picture in FIG. 7), the trained neural network system may determine kernels of target lines/strings. Following the determination of the bounding boxes of text lines/strings, the boxes may subsequently be expanded back to the regular dimensions, depending on the scheme used in training. For example, in instances where the 30/40/30 scheme is used, once it is determined that the top of the bounding box for a text line has coordinate $y_1$ and the bottom of the bounding box has coordinate $y_1$, the expansion operation may be performed as follows: $y_1 \rightarrow Y_1 = (7*y_1 - 3*y_2)/4$, $y_2 \rightarrow Y_2 = (7*y_2 - 3*y_1)/4$. Such expansion keeps the center of the bounding box in place, $(y_1+y_2)/2=(Y_1+Y_2)/2$, while increasing the width of the box $y_1 - y_2$ from 40% back to 100%: $Y_1 - Y_2 = 5(y1-y2)/2$.

Figure 8:
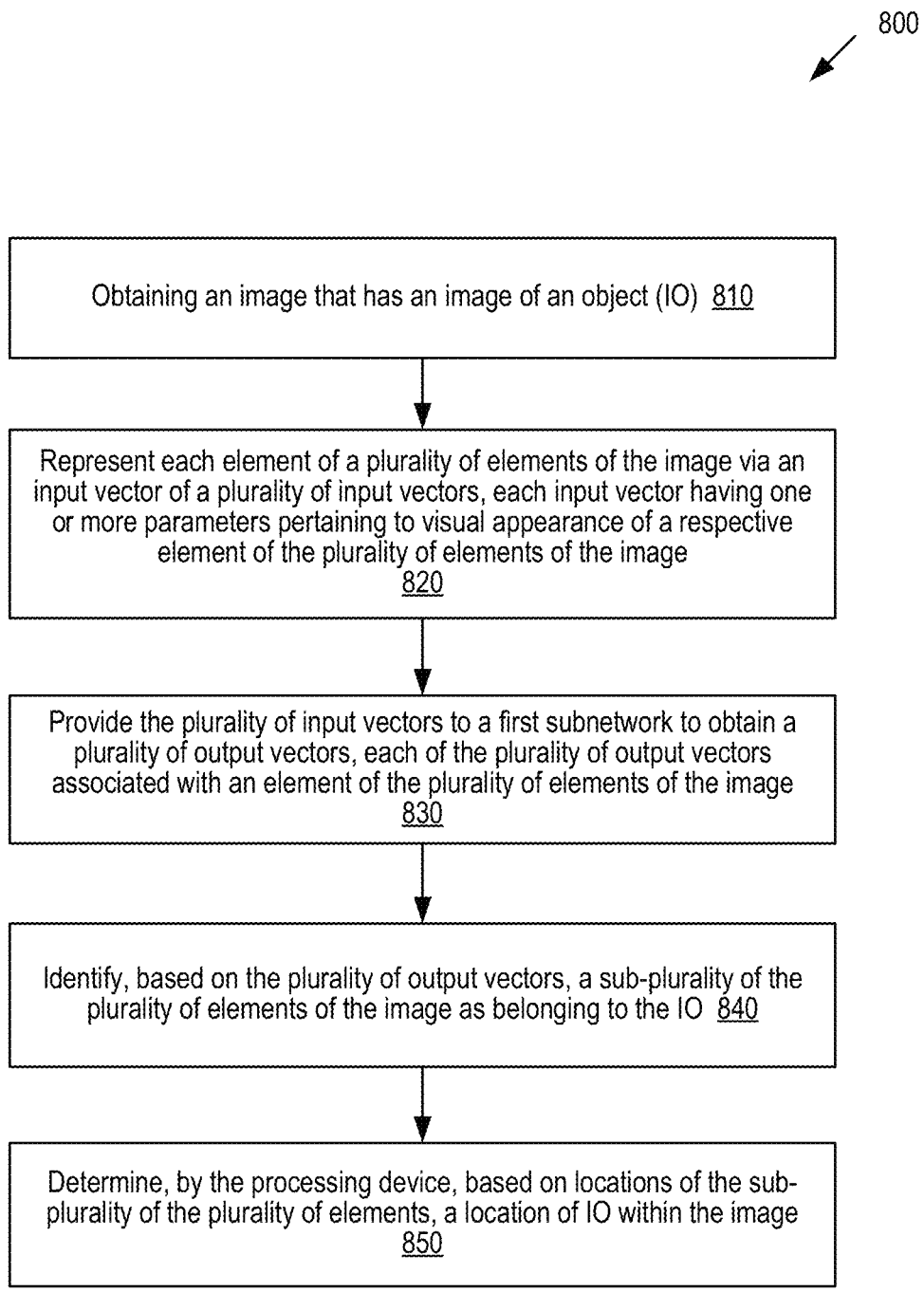
FIG. 8 is a flow diagram illustrating one exemplary method of detecting presence of objects in images, in accordance with some implementations of the present disclosure.
Figure 9:
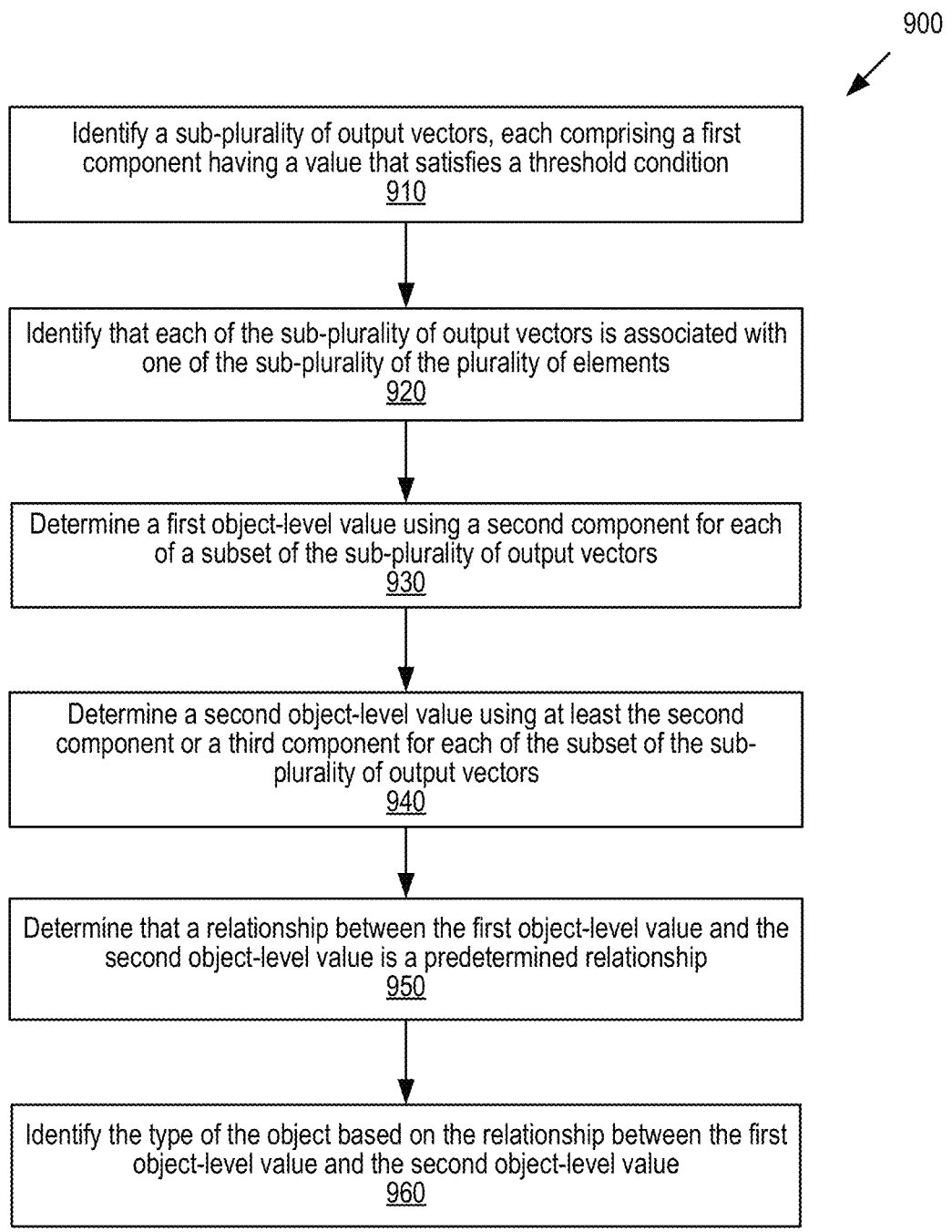
FIG. 9 is a flow diagram illustrating one exemplary method of identifying a type of the detected object, in accordance with some implementations of the present disclosure.

FIGS. 8-9 are flow diagrams illustrating exemplary methods 800-900 that use image context for detecting objects and identifying types of detected objects in images, in accordance with some implementations of the present disclosure. Each of methods 800-900 may be performed by processing logic that may comprise hardware (e.g., circuitry, dedicated logic, programmable logic, microcode, etc.), software (such as instructions run on a processing device), firmware, or a combination thereof. In one implementation, methods 800-900 may be performed by a processing device (e.g. a processing device 1002 of FIG. 10) of a computing device 110 and/or a server machine 150 as described in connection with FIG. 1. In some implementations, the processing device may perform methods 800-900 responsive to instructions from the IPE 112. In certain implementations, methods 800-900 may be performed by a single processing thread. Alternatively, methods 800-900 may be performed by two or more processing threads, each thread executing one or more individual functions, routines, subroutines, or operations of the method. For example, a first thread may be used to detect objects of a first class and a second thread may be used to detect objects of a second class. In an illustrative example, the processing threads implementing methods 800-900 may be synchronized (e.g., using semaphores, critical sections, and/or other thread synchronization mechanisms). Alternatively, the processing threads implementing methods 800-900 may be executed asynchronously with respect to each other. Therefore, while FIGS. 8-9 and the associated descriptions list the operations of methods 800-900 in a certain order, various implementations of the methods may perform at least some of the described operations in parallel and/or in arbitrary selected orders.

FIG. 8 is a flow diagram illustrating one exemplary method 800 of detecting presence of objects in images, in accordance with some implementations of the present disclosure. At operation 810, the processing device performing method 800 may obtain an image. The image may include an image of an object. At operation 820, the method 800 may continue with the processing device representing each element of a plurality of elements of the image via an input vector of a plurality of input vectors. The elements may be superpixels, encompassing multiple pixels. Each element with coordinates (x,y) may be described by an input vector vec(x,y) having one or more parameters (components) pertaining to visual appearance of a respective element. The visual appearance may refer to intensity values (for various colors) of the pixels of the element. To represent the elements (x,y) via input vectors vec(x,y), the processing device may provide intensity values as input into a trained neural network, such as the subsystem A 430 of FIG. 4, in one implementation.

The subsystem A 430 may determine the parameter(s) pertaining to visual appearance of an element of the image using one or more input values. In some implementations, each of the one or more input values pertaining to visual appearance of the element of the image may include an intensity value of at least one pixel of the element. In some implementations, the input values may include intensity values for all pixels of the elements. Accordingly, the subsystem A 430 may determine the parameter(s) describing visual appearance of the elements of the image in view of a first plurality of intensity values for a first color (e.g., black, red, or any other color) for the underlying pixels of the element. The subsystem A 430 may further determine the parameter(s) pertaining to visual appearance of the element of the image in view of a second (third, and so on) plurality of intensity values for a second (third, and so on) first color (e.g., red, green, or any other color) for the underlying pixels.

In some implementations, the plurality of elements of the image may include all the elements of the image. In other implementations, only a part of the image may be represented by a plurality of elements. For example, if it is known that an object (e.g., a barcode) can only appear at the bottom of the image, only a lower portion of the image may be represented by the plurality of elements and the top portion of the image may be ignored in further processing, in some implementations.

At operation 830, the method 800 may continue with providing the plurality of input vectors to a first neural network to obtain a plurality of output vectors VEC(x,y) associated with the element (x,y) of the image. The first neural network may be the subsystem B 450, in one implementation. It shall be understood that "first" and "second" is not a reference to any chronological order in which the subsystem B 450 (or the subsystem A 430) is to operate relative to other entities that may be involved in performing the method 800. In particular, in some implementations, computations performed by the "second" subsystem A 430 may precede computations performed by the "first" subsystem B 450. In various implementations, the output vector VEC(x0,y0) associated with a given element (x0,y0) of the plurality of elements may depend on a subset of input vectors {vec(x,y)} with the range of coordinates (x,y) that represent some neighborhood of the element (x0,y0), e.g., elements that are adjacent to the element (x0,y0). This may ensure that the vectors VEC(x,y) account for a broader context of the image. The size of the neighborhood may be pre-determined (e.g., the optimal size may be determined during training of the subsystem B 450). In some implementations, the pre-determined amount of elements adjacent to the element (x0,y0) may be specified in terms of the number of elements. For example, the pre-determined amount of elements adjacent to the element (x0,y0) may include all elements within a rectangle of p×q elements centered at the element (x0,y0). In other implementations, the pre-determined amount of elements adjacent to the element (x0,y0) may be defined in terms of the portion of the image that is centered around the element (x0,y0), which may be ⅛ of the size of the image, ¼ of the size of the image, ½ of the size of the image, a full size of the image, or any other portion of the image.

The method 800 may continue with the processing device identifying, based on the output vectors VEC(x,y), a sub-plurality of the plurality of elements of the image as belonging to the image of the object (operation 840). For example, the processing device may identify that the sub-plurality of output vectors has a first component ($Z_1$) that satisfies a threshold condition. In some implementations, an output vector VEC(x,y) is identified as belonging to the image of the object if its first component is greater than some threshold value, such as 0.5. Having identified the sub-plurality of the plurality of vectors {VEC(x,y)}, which satisfy the threshold condition, the processing device may further identify the sub-plurality of elements of the image that are associated with the corresponding vectors VEC(x,y) of the sub-plurality of output vectors.

At operation 850, the processing device may determine, based on locations of the sub-plurality of elements, a location of the image of the object within the image, as illustrated in FIGS. 3 and 5, in some exemplary implementations.

FIG. 9 is a flow diagram illustrating one exemplary method 900 of identifying a type of the detected object, in accordance with some implementations of the present disclosure. At operation 910, the processing device performing method 900 may identify the sub-plurality of output vectors VEC(x,y) having a first component that satisfies a threshold condition, similar to the operation 840 described above. After the processing device identifies the sub-plurality of elements (e.g., by their coordinates) that are associated with the sub-plurality of output vectors VEC(x,y) (operation 920), the method 900 may continue with determining a first object-level value using a second component ($Z_2$) of each vector of the subset of the sub-plurality of output vectors VEC(x,y). More specifically, the processing device may provide the components $Z_2, Z_3, \ldots$ to the subsystem C 480, in one implementation.

The components provided to the subsystem C 480 may be used by the subsystem C 480 to identify a type of the object. For example, the processing device may determine a first object-level value $W_1(object)$ that describes a likelihood that the detected (e.g., by the method 800) object belongs to a first type. The first object-level value $W_1(object)$ may be a weighted average of the element-level values $W_1(x,y)$ for various elements associated with the detected object. The element-level values $W_1(x,y)$ may be representative of a likelihood that the element (x,y) is part of an object that belongs to the first type of the objects of a given class. In some implementations, the element-level value $W_1(x,y)$ may be determined using only the component $Z_2$ of the elements associated with the detected object. In some implementations, the element-level value $W_1(x,y)$ may be determined using multiple components $Z_2, Z_3, \ldots$ of the elements associated with the detected object.

At operation 940, the method may continue with similarly determining a second object-level value $W_2(object)$ using at least the second component $Z_2$ or a third component $Z_3$ of the output vectors VEC(x,y) of the elements (x,y) of the detected object. The second object-level value $W_2(object)$ may be a weighted average of the element-level values $W_2(x,y)$ for various elements associated with the detected object. The element-level values $W_2(x,y)$ may be representative of a likelihood that the element (x,y) is part of an object that belongs to the second type of the objects of the given class. In some implementations, the element-level value $W_2(x,y)$ may be determined using only the component $Z_2$ of the elements associated with the detected object. For example, a particular class may only include two types of objects (e.g., a city government seal and a state government seal). In such implementations, a type of a detected object may be determined based on a single component $Z_2$. In some implementations, the element-level value $W_2(x,y)$ may need to be determined by using multiple components $Z_2, Z_3, \ldots$ of the elements associated with the detected object.

At operation 950, the processing device may determine that a relationship between the first object-level value and the second object-level value is a predetermined relationship. For example, the processing device may determine that $W_2(object) > W_1(object)$. At operation 960, the processing device may identify the type of the object based on the relationship between the first object-level value and the second object-level value. For example, based on the identified relationship $W_2(object) > W_1(object)$, the processing device may determine that the detected object belongs to the second type.

Figure 10:
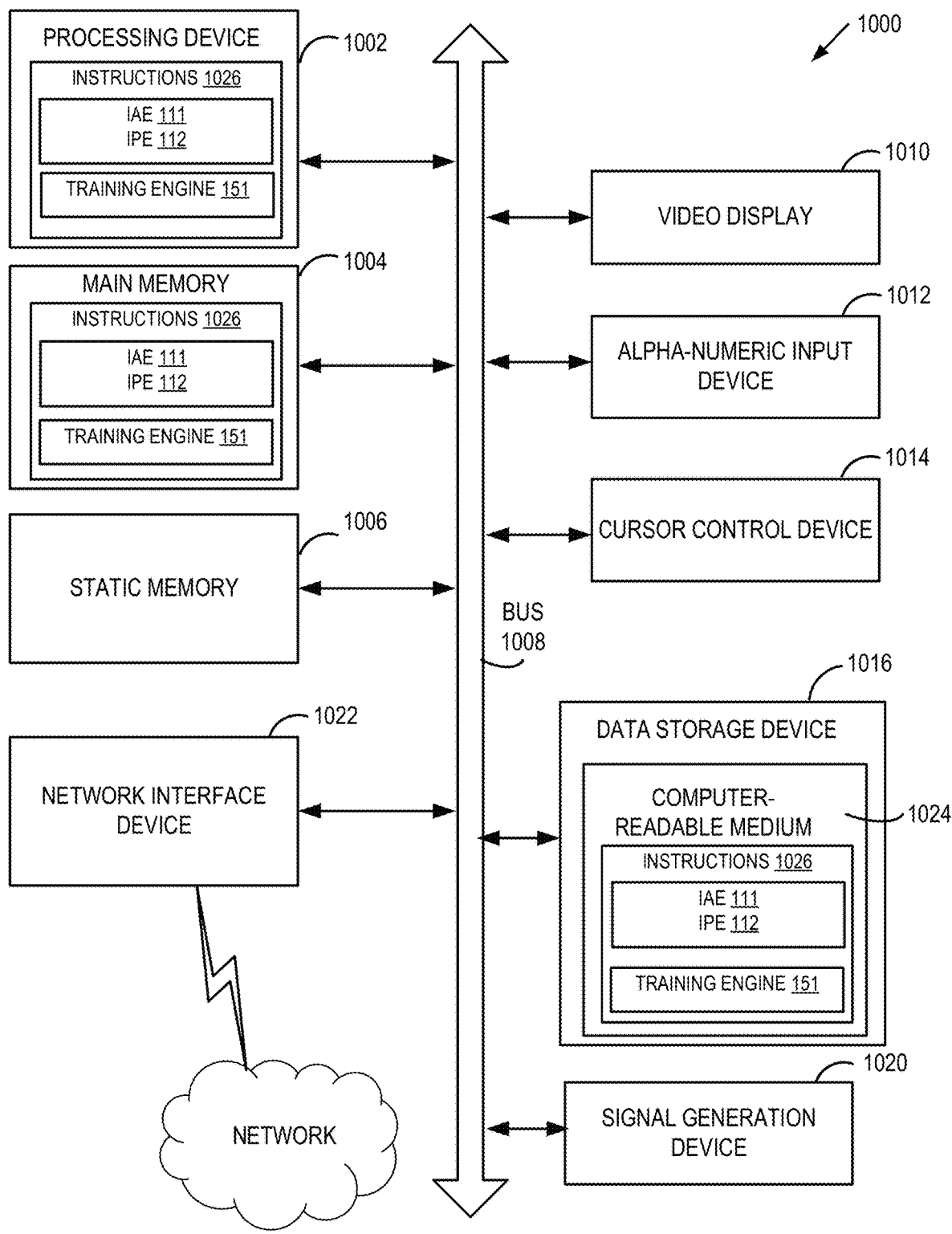
FIG. 10 depicts an example computer system that can perform any one or more of the methods described herein, in accordance with some implementations of the present disclosure.

FIG. 10 depicts an example computer system 1000 that can perform any one or more of the methods described herein, in accordance with some implementations of the present disclosure. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1000 includes a processing device 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1016, which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for implementing the IPE 112 (and or IAE 111) and/or the training engine 151 of FIG. 1 and to perform the operations and steps discussed herein (e.g., methods 800-900 of FIGS. 8-9).

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker). In one illustrative example, the video display unit 1010, the alphanumeric input device 1012, and the cursor control device 1014 may be combined into a single component or device (e.g., an LCD touch screen).

The data storage device 1016 may include a computer-readable storage medium 1024 on which is stored the instructions 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting computer-readable media. In some implementations, the instructions 1026 may further be transmitted or received over a network via the network interface device 1022.

While the computer-readable storage medium 1024 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
obtaining an image, wherein the image comprises an image of an object (IO);
computing, using a first neural network, a plurality of output vectors, wherein each output vector of the plurality of output vectors is associated with a respective element of a plurality of elements of the image and depends on a visual context of at least a neighborhood of adjacent elements of the image;
forming, using the plurality of output vectors, a plurality of element-level hypotheses, wherein each element-level hypothesis predicts a likelihood that the respective element of the image is associated with the IO;
forming, using the plurality of element-level hypotheses, one or more object-level hypotheses, each of the object-level hypotheses prospectively associating a subset of the plurality of the elements of the image with the IO; and
selecting, using the plurality of output vectors, an object-level hypothesis of the one or more object-level hypotheses, the selected object-level hypothesis predicting one or more characteristics of the IO.

2. The method of claim 1, wherein the one or more characteristics of the IO comprise a location of the IO and a type of the IO.

3. The method of claim 1, wherein forming the plurality of element-level hypotheses comprises identifying a subplurality of spatially aggregated elements represented by the output vectors having a first component that satisfies a threshold condition.

4. The method of claim 1, wherein forming the one or more object-level hypotheses comprises:
identifying a group of elements of the plurality of elements of the image, wherein at least a portion of elements of the identified group of elements is predicted, according to the plurality of element-level hypotheses, to be associated with the IO.

5. The method of claim 4, wherein forming a first object-level hypothesis of the one or more object-level hypotheses comprises:
obtaining, using the output vectors associated with the identified group of elements, a plurality of first element-level scores, each first element-level score characterizing a likelihood of a corresponding element of the identified group of elements to be associated with the IO of a first type; and
obtaining, using the plurality of first element-level scores, an aggregated first object-level score characterizing a likelihood of the IO to be of the first type; and
wherein the method further comprises:
predicting, using the aggregated first object-level score, one or more characteristics of the IO.

6. The method of claim 5, wherein forming a second object-level hypothesis of the one or more object-level hypotheses comprises:
obtaining, using the output vectors associated with the identified group of elements, a plurality of second element-level scores, each second element-level score characterizing a likelihood of the corresponding element of the identified group of elements to be associated with the IO of a second type; and
obtaining, using the plurality of second element-level scores, an aggregated second object-level score characterizing a likelihood of the IO to be of the second type; and
wherein predicting the one or more characteristics of the IO comprises:
determining the IO to be of the first type based on a predetermined relation between the aggregated first object-level score and the aggregated second object-level score.

7. The method of claim 1, wherein computing the plurality of output vectors comprises processing, using the first neural network, a plurality of input vectors for the first neural network, where the plurality of input vectors for the first neural network is obtained using operations that comprise:
representing of the plurality of elements of the image via intensity values; and
processing the intensity values using a second neural network to obtain the plurality of input vectors for the first neural network.

8. A system comprising:
a memory; and
a processing device operatively coupled to the memory, the processing device to:
obtain an image, wherein the image comprises an image of an object (IO);
compute, using a first neural network, a plurality of output vectors, wherein each output vector of the plurality of output vectors is associated with a respective element of a plurality of elements of the image and depends on a visual context of at least a neighborhood of adjacent elements of the image;
form, using the plurality of output vectors, a plurality of element-level hypotheses, wherein each element-level hypothesis predicts a likelihood that the respective element of the image is associated with the IO;
form, using the plurality of element-level hypotheses, one or more object-level hypotheses, each of the object-level hypotheses prospectively associating a subset of the plurality of the elements of the image with the IO; and
select, using the plurality of output vectors, an object-level hypothesis of the one or more object-level hypotheses, the selected object-level hypothesis predicting one or more characteristics of the IO.

9. The system of claim 8, wherein the one or more characteristics of the IO comprise a location of the IO and a type of the IO.

10. The system of claim 8, wherein to form the plurality of element-level hypotheses, the processing device is to identify a subplurality of spatially aggregated elements represented by the output vectors having a first component that satisfies a threshold condition.

11. The system of claim 8, wherein to form the one or more object-level hypotheses, the processing device is to:
identify a group of elements of the plurality of elements of the image, wherein at least a portion of elements of the identified group of elements is predicted, according to the plurality of element-level hypotheses, to be associated with the IO.

12. The system of claim 11, wherein to form a first object-level hypothesis of the one or more object-level hypotheses, the processing device is to:
obtain, using the output vectors associated with the identified group of elements, a plurality of first element-level scores, each first element-level score characterizing a likelihood of a corresponding element of the identified group of elements to be associated with the IO of a first type; and obtain, using the plurality of first element-level scores, an aggregated first object-level score characterizing a likelihood of the IO to be of the first type; and wherein the processing device is further to:

predict, using the aggregated first object-level score, one or more properties of the IO.

13. The system of claim 12, wherein to form a second object-level hypothesis of the one or more object-level hypotheses, the processing device is to:

obtain, using the output vectors associated with the identified group of elements, a plurality of second element-level scores, each second element-level score characterizing a likelihood of the corresponding element of the identified group of elements to be associated with the IO of a second type; and obtain, using the plurality of second element-level scores, an aggregated second object-level score characterizing a likelihood of the IO to be of the second type; and wherein to predict the one or more properties of the IO, the processing device is to:

determine the IO to be of the first type based on a predetermined relation between the aggregated first object-level score and the aggregated second object-level score.

14. The system of claim 9, wherein to compute the plurality of output vectors, the processing device is to process, using the first neural network, a plurality of input vectors for the first neural network, and wherein to obtain the plurality of input vectors for the first neural network, the processing device is to:

represent of the plurality of elements of the image via intensity values; and process the intensity values using a second neural network to obtain the plurality of input vectors for the first neural network.

15. A non-transitory machine-readable storage medium including instructions that, when accessed by a processing device, cause the processing device to:

obtain an image, wherein the image comprises an image of an object (IO);

compute, using a first neural network, a plurality of output vectors, wherein each output vector of the plurality of output vectors is associated with a respective element of a plurality of elements of the image and depends on a visual context of at least a neighborhood of adjacent elements of the image;

form, using the plurality of output vectors, a plurality of element-level hypotheses, wherein each element-level hypothesis predicts a likelihood that the respective element of the image is associated with the IO;

form, using the plurality of element-level hypotheses, one or more object-level hypotheses, each of the object-level hypotheses prospectively associating a subset of the plurality of the elements of the image with the IO; and select, using the plurality of output vectors, an object-level hypothesis of the one or more object-level hypotheses, the selected object-level hypothesis predicting one or more characteristics of the IO.

16. The non-transitory machine-readable storage medium of claim 15, wherein the one or more characteristics of the IO comprise a location of the IO and a type of the IO.

17. The non-transitory machine-readable storage medium of claim 16, wherein to form the plurality of element-level hypotheses, the processing device is to identify a subplurality of spatially aggregated elements represented by the output vectors having a first component that satisfies a threshold condition.

18. The non-transitory machine-readable storage medium of claim 16, wherein to form the one or more object-level hypotheses, the processing device is to:

identify a group of elements of the plurality of elements of the image, wherein at least a portion of elements of the identified group of elements is predicted, according to the plurality of element-level hypotheses, to be associated with the IO.

19. The non-transitory machine-readable storage medium of claim 18, wherein to form a first object-level hypothesis of the one or more object-level hypotheses, the processing device is to:

obtain, using the output vectors associated with the identified group of elements, a plurality of first element-level scores, each first element-level score characterizing a likelihood of a corresponding element of the identified group of elements to be associated with the IO of a first type; and obtain, using the plurality of first element-level scores, an aggregated first object-level score characterizing a likelihood of the IO to be of the first type; and wherein the processing device is further to:

predict, using the aggregated first object-level score, one or more characteristics of the IO.

20. The non-transitory machine-readable storage medium of claim 19, wherein to form a second object-level hypothesis of the one or more object-level hypotheses, the processing device is to:

obtain, using the output vectors associated with the identified group of elements, a plurality of second element-level scores, each second element-level score characterizing a likelihood of the corresponding element of the identified group of elements to be associated with the IO of a second type; and obtain, using the plurality of second element-level scores, an aggregated second object-level score characterizing a likelihood of the IO to be of the second type; and wherein to predict the one or more characteristics of the IO, the processing device is to:

determine the IO to be of the first type based on a predetermined relation between the aggregated first object-level score and the aggregated second object-level score.

* * * * *